June 15, 1937.  R. THOMPSON  2,083,879
ATTACHMENT FOR THRESHING MACHINES
Filed Oct. 19, 1934
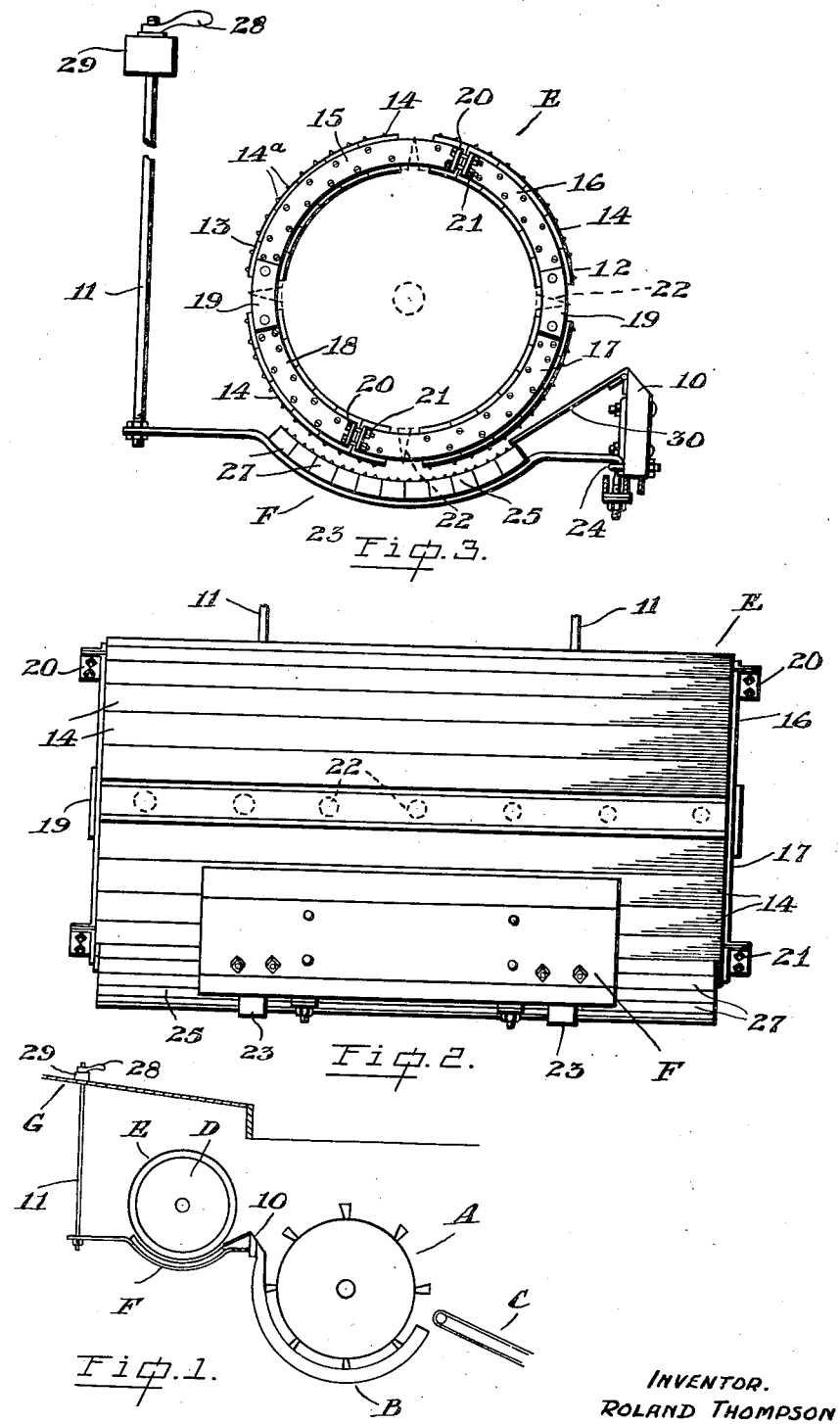
INVENTOR.
ROLAND THOMPSON.
BY Eugene C. Stevens
ATT'Y.

Patented June 15, 1937

2,083,879

UNITED STATES PATENT OFFICE 2,083,879

ATTACHMENT FOR THRESHING MACHINES

Roland Thompson, Staples, Ontario, Canada

Application October 19, 1934, Serial No. 749,117

1 Claim. (Cl. 130—2)

This invention relates to an attachment for threshing machines.

The main object of the invention is to provide an attachment by which a threshing machine may be adapted for hulling clover.

A further object of the invention is to provide an apparatus that may be quickly attached without removing any of the major parts of the threshing machine and which may be detached again with ease to enable the machine to perform its primary function.

A further object of the invention is to provide a structure which is simple yet strong, efficient and durable and which will enable the threshing machine to hull clover with the efficiency of a separate hulling machine.

With these and other objects in view the invention consists essentially in a rotating part or collapsible cylindrical drum adapted for attachment to the beater drum of a threshing machine and a cooperating stationary part including a concave adapted for attachment at one end to the grates of the threshing machine and at the other for adjustable mounting on the frame of the threshing machine.

Referring to the drawing:—

Figure 1 is a diagrammatic view illustrating the location of the various parts of a threshing machine and of the attachment.

Figure 2 is an end elevation showing the attachment in position on a threshing machine, and Figure 3 is a side elevation of the attachment secured to a threshing machine.

Referring more particularly to the drawing, A represents the threshing cylinder, B the grates and C the elevator of a threshing machine. D is the beater drum of the threshing machine with the rotating part E of the novel attachment secured thereto while F is the stationary part or concave of the attachment secured at one end to a baffle 10 bolted to the grates B of the threshing machine and at the other end to a shaft 11 slidably mounted in the main frame G of the threshing machine. This baffle 10 constitutes a means of directing and controlling the force imparted to the straw by reason of its weight and the velocity imparted to it by the threshing cylinder. It impacts an upward motion to the straw which prevents it falling between the cylinders, piling up and finally backwinding about the threshing cylinder. The velocity imparted to the straw is thus used to introduce the straw to the hulling concave in an effective way.

The cylinder E of the attachment is formed preferably of two sections 12 and 13 whose inner surfaces are adapted to conform to the outline of the beater drum D. Each of these sections is made up of a plurality of identical staves 14, preferably of hardwood, and carrying standard clover huller rasps 14a. The staves 14 are held in position by arcuate braces 15 and 16, 17 and 18, to which both ends of the staves 14 are secured. One end of the brace 15 is pivotally connected to an end of the brace 18 by means of a strap hinge 19, the ends of the braces 16 and 17 being likewise connected. The ends of each of the braces 15 and 16, 17 and 18, opposite to those accommodating the strap hinges 19, are formed with flanges 20 drilled to hold bolts 21 by means of which their adjacent ends may be securely fastened together.

The cylindrical member E is formed so that its inner periphery is slightly smaller in length than the outer circumference of the beater drum D. In this manner, when the attachment encircles the beater drum, the ends of the sections 12 and 13 do not quite meet, there being at the same time a small space separating the adjacent flanges 20. Consequently the tightening of the bolts 21 will tend to draw the sections 12 and 13 together and to hold them tightly against the beater drum D. The flexibility of the sections, made possible by the action of the strap hinges 19, will cause equal pressure to be exerted by the entire inner surface of the member E throughout that of the beater drum D.

Spaces are provided at suitable positions in the respective sections 12 and 13 to accommodate the spikes 22 of the drum cylinder, shown in dotted lines in Figure 3. This is most easily accomplished by omitting one of the staves 14 at each of these points.

The stationary part of the attachment, including the concave, is made up of braces 23 secured at one end to the baffle 10 by U-bolts 24, the baffle 10 being bolted to the grates B. At their opposite ends the braces 23 are secured to the lower portion of shafts 11, the upper portions of which are slidably mounted in the main frame G. The braces 23 have a concave portion 25 positioned directly beneath the beater drum D. On the upper side of this concave portion 25 are mounted transverse staves 27 adapted to include standard clover huller rasps which co-operate with the rasps on the cylinder E.

The upper portions of the shafts 11 are slidably mounted in the frame G, ends of these shafts being threaded to accommodate hand screws 28 having bearings 29 on the frame G.

The manipulation of the screws 28 makes possible the vertical adjustment of the shafts 24 and consequently of the concave B in relation to the cylinder E.

An apron 30 is hingedly secured to the baffle 10 and extends downwardly and inwardly to meet the staves 27 forming a chute to convey the clover to the concave F.

The method of securing the attachment to a threshing machine is as follows:—One end of each of the sections 12 and 13 of the cylinder member E may be partially secured to each other at the start by tightening the bolts 21. This set of bolts may be kept locked at all times. Portions of the sections 12 and 13 are then swung outwards to make way for the beater drum D, this being accomplished through the pivotal mounting of the sections by the strap hinges 19. The device may then be mounted to encircle the beater drum D so that the spikes 22 fall within the allotted spaces in the member E.

The remaining bolts 21 are then inserted into the flanges 20 and tightened, thus securing a tight fit between the rotary portion E of the attachment and the beater drum D. The stationary member F may then be secured by bolting the baffle 10 to the grates B and mounting the shafts 11 in the frame G. The concave may be adjusted to a suitable distance from the drum E by manipulation of the hand screws 28.

Various modifications may be made in this invention without departing from the spirit thereof or the scope of the claim, and therefore the exact forms shown are to be taken as illustrative only and not in a limiting sense, and it is desired that only such limitations shall be placed thereon as are disclosed in the prior art or are set forth in the accompanying claim.

What I claim as my invention is:—

In a threshing machine including a threshing cylinder, a concave therefor and a beater drum, clover hulling means mounted on said beater drum, a concave associated with said beater drum and a substantially vertical baffle board co-operating with the threshing cylinder, the beater drum and the associated concaves to cause the clover to travel from the threshing cylinder to the beater drum, the upper edge of said baffle board being sloped and forming a continuation of the threshing cylinder concave.

ROLAND THOMPSON.